April 17, 1956
H. J. OGORZALY
2,742,354
IRON ORE REDUCTION PROCESS
Filed Nov. 1, 1954
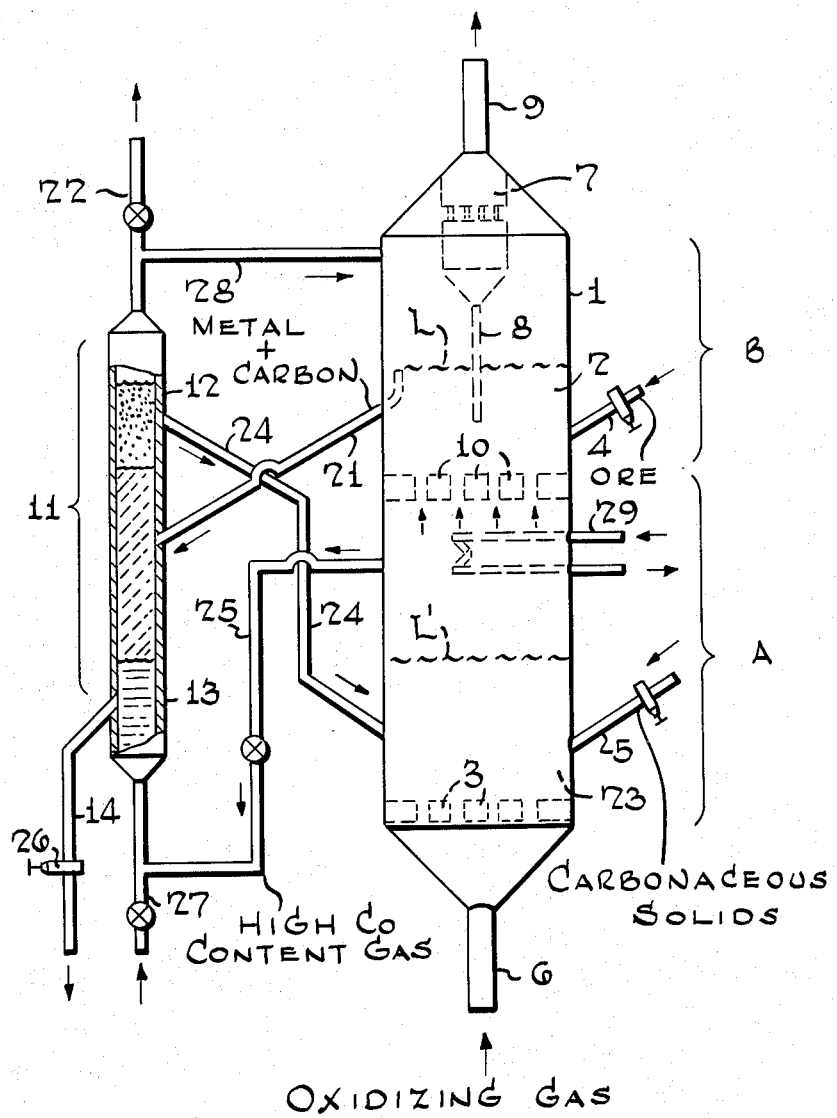
Henry J. Ogorzaly Inventor
By Henry Berk Attorney

United States Patent Office 2,742,354
Patented Apr. 17, 1956

2,742,354

IRON ORE REDUCTION PROCESS

Henry J. Ogorzaly, Summit, N. J., assignor to Esso Research and Engineering Company, a corporation of Delaware Application November 1, 1954, Serial No. 465,960

4 Claims. (Cl. 75—26)

This invention relates to a process for reducing ores of the iron ore type to metal by contacting the ore in a fluid bed at moderate temperatures with a gas of high CO content which also contains entrained carbon, said CO rich gas being produced by high temperature gasification of carbonaceous materials in a second fluid bed. The invention is specifically applicable to the production of sponge iron from iron ore.

This application is a continuation-in-part of Serial No. 290,146, filed May 27, 1952, now abandoned.

In copending application, Serial No. 465,959, filed of even date herewith, an ore reduction process is described in which carbonaceous materials are converted into a CO-containing gas, in part while intimately mixed in a fluidized bed with the ore to be reduced. The CO produced is the main agent for effecting the reduction of the ore. Because of the nature of the carbonaceous material it is sometimes necessary to maintain the fluidized bed in such a process at relatively high temperatures, of the order of 1800° F. and above, in order to produce a gasification product sufficiently rich in CO for satisfactory reduction of the iron ore admixed with the carbonaceous material undergoing gasification. Frequently temperatures of this level are high enough to cause sintering and result in unsatisfactory fluidization of the ore bed. This may occur even though a substantial excess of solid carbon, which tends to prevent sticking of the reduced ore, may be present.

This invention proposes a process whereby all the advantages of employing cheap and available solid reducing agents for ore reduction are retained while completely eliminating the above disadvantage.

In accordance with the invention a high CO content gas containing entrained carbon is manufactured from a carbonaceous solid such as coal, charcoal, coke, petroleum coke, peat, lignite or the like in a separate fluidized gasification zone.

The carbonaceous solid is added to the process in a ratio equivalent to about 0.3 to 0.75 part by weight of carbon per part of ore. Both the carbonaceous solid and the iron ore may be comminuted to approximately the same size, about 20 to 500 microns. However, the carbon may be somewhat coarser than the ore when charged but not larger than about 20-mesh; the lower density of the carbon allows it to be fluidized more readily than the ore, and also its particle size diminishes as it is consumed in processing. The gas so produced, is introduced into a fluidized ore reduction zone which is preferably superimposed directly above the gasification zone and which generally operates at a temperature below that of the gasification zone. In the reduction zone, the ore is reduced by means of the CO-rich gas which is carried into the reduction zone from the gasifier. The reduced metal together with unreacted carbon entrained from the gasifier is removed from the reducing zone to a low velocity separation zone where gas of a non-oxidizing or reducing nature separates an upper layer of carbon from a lower layer of reduced metal.

Ores suitable for treatment according to the present invention include oxidic iron ores such as hematite, magnetite, limonite, siderite, and laterite. As is well known, these iron ores are found in sedimentary and metamorphic rocks, usually associated with other mineral constituents such as quartz and clays. To be useful for purposes of the invention it is desirable that the iron ore contain at least about 40% Fe, preferably above 50% Fe.

Before charging to the process the ore is ground or pulverized as indicated before. The optimum particle size will depend somewhat on the density of the ore and the upward velocity of the fluidizing gas in the reactor, which velocity may range from about 0.5 to 5 feet per second, or preferably about 1.5 to 3 feet per second. With the preferred gas velocities just stated the average particle size of the ore may advantageously be in the range of about 20 to 150 microns.

The gasification zone can be conveniently fluidized with air, though other combustion supporting gases such as oxygen enriched air, pure oxygen, or mixtures of oxygen and steam can be used similarly. Of course, the ore in the ore reduction zone is fluidized by the CO-rich combustion gas produced in the gasification zone. The amount of air or combustion supporting gas is injected into the gasification zone in an amount sufficient to provide about 15 to 30 standard cubic feet of oxygen per pound of carbon supplied. Carbon in turn is supplied at a rate of about 0.3 to 0.75 part per part of ore. The factor which primarily determines the carbon requirement of the process is the quantity of heat which must be supplied while maintaining a gas of sufficiently strong reducing power as indicated by the CO content of the discharged gas.

The invention will be more fully understood by referring to the accompanying drawing which is a semi-diagrammatic view in sectional elevation of one type of apparatus suitable for carrying out this invention.

Referring to the drawing, the numeral 1 represents a vessel comprising a lower high temperature gasifying zone A and an upper reduction zone B. The gasification zone contains a bed of finely-divided carbonaceous solid 23 undergoing gasification. The upper level of this bed is represented by L'. This bed is supported on a grid 3. In the reduction zone situated directly above the gasifier is a fluidized bed of solid ore 2 supported on grid 10. The upper level of the ore bed is represented by L. With respect to vessel 1, provision is made at the bottom for conduit 6 for the upward introduction of preheated air into the high temperature gasification zone; conduit 5 for the introduction of finely-divided coke to the gasifier zone; conduit 4 for the introduction of finely-divided ore to the ore reduction zone; conduit 21 for the removal of reduced metal and carbon from the ore reduction zone to separation zone 11; conduit 25 for the bleeding of high CO content gas from the gasifier to the separation zone; cyclone system 7 with dip-leg 8 for the return of recovered fines from gases leaving the reduction zone; pipe 9 for the removal of gases from the reduction zone via the cyclone system; and line 24 for the return of recovered carbon from the separation zone to the gasifier.

Separator 11 is a vessel, preferably of smaller diameter with respect to vessel 1, into which the mixture of reduced metal and carbon is transferred from the reduction zone via line 21.

The vessel is provided with conduit 27 at the bottom for the introduction of low velocity reducing gas in order to separate the carbon from the reduced metal; conduit 14 equipped with a slide valve 26 for the removal of reduced metal 13; conduit 24 for the return of separated carbon 12 from the separation zone 11 to the high temperature gasifier; and pipe 22 for the removal of vent gases.

The operation of the process will be described with reference to the reduction of a hematite ore containing 78.6% $Fe_2O_3$, 7.3% $SiO_2$ and 14.1% $H_2O$. In the process petroleum coke is introduced into section A of vessel 1 at a rate of about 0.35 part per part of ore and gasified with air in fluid bed 23 at a high temperature level in the range of 1500 to 2700° F., e. g. at 2200° F. Air is fed into the gasification bed at a rate equivalent to about 15 standard cubic feet of oxygen per pound of coke; its oxygen content is essentially completely consumed in bed 23. This bed is preferentially the lower bed of the two-bed vessel as shown in the drawing. Alternatively, however, the gasifier zone may be contained in an entirely separate vessel. The depth of the gasification bed is desirably between about 10 and 30 feet, e. g. 20 feet, so as to aid in keeping a high concentration of carbon monoxide relative to carbon dioxide. In any case, gasification of the coke occurs at high temperature conducive to the production of a gas of high CO and low $CO_2$ content. This hot gas is directed through a distributing grid 10 into a bed of ore 2 which is maintained by the sensible heat of the reducing gas at a moderate temperature level suitable for the reduction of the ore by the CO rich gas. This temperature level is in the range of 1000 to 1500 or as high as 2000° F., preferably at about 1300° F. The pressure drop across the holes of distributing grid 10 is such that gas flows from the gasifier into the reduction zone at a rate which prevents passage of the solid from the ore reduction zone into the gasifier. Normally a pressure drop across the grid of 0.5 to 1.0 p. s. i. is satisfactory.

Finely divided ore is charged directly to the bed 2 via conduit 4. The hot gases from the gasification zone also carry into the reduction bed a substantial amount of entrained carbon which serves the very useful purpose of minimizing the tendency of the reduced metal particles to stick together. As a consequence the temperature of operation in the reduction bed may be considerably higher than that tolerable in the absence of such carbon particles. Because of this the reduction rate may be sensibly increased over rates experienced by reduction with CO-rich gas in the absence of solid carbon. Velocities in the gasification and reduction zones are about 2.5 feet per second. At this velocity the turbulence within the respective beds is such that in the reduction zone the solids are dispersed throughout the bed and intimate mixing of ore and carbon is secured while in the gasifier the formation of hot spots in the highly exothermic combustion area is effectively avoided. The process may be operated at pressures up to about 10 or 20 atmospheres, but substantially atmospheric operating pressures are normally preferred.

No means for separating entrained solid is required between the gasification zone and the reducing zone. However, it may be occasionally desirable to remove heat from the entrained carbon and the gases produced in the gasifier by means of indirect heat exchange apparatus 29, such as a waste heat boiler. Solids are recovered from the gases leaving the reduction zone by the cyclone system 7 and returned to the bed 2 by means of dip-leg 8.

A mixture of reduced metal and carbon overflows from the fluid reducing bed 2 via line 21 and is introduced into low velocity separator 11, preferably near the midsection thereof. The separator operates at a temperature in the same general range as that existing in the ore reduction bed. In the separator the mixture separates into a lower metal phase 13 and an upper carbon phase 12. Separation is effected with the aid of a low velocity reducing gas introduced into the bottom via line 27. A portion of the gas produced in the process by gasification of the carbon charge may be used for this purpose. In such an event the bleed stream via line 25 is employed. However, any other non-oxidizing gas such as nitrogen can be substituted for the CO-rich process gas. The low gas velocity in separator 11 is such that the solids, while aerated in the form of a dense fluidized mass, are not maintained in turbulent motion such as exists in the gasifier and reduction zone. As a result of the considerable difference in buoyancy of the two solids, the light carbonaceous matter is easily separated as an upper layer from the heavy reduced iron which forms the lower layer. The layer of iron is removed from the system via pipe 14 equipped with valve 26. Suitable superficial velocities measured across the total cross-sectional area of separator 11 are in the range of 0.02 to 0.50, e. g. about 0.10, feet per second. The separated carbon is preferably returned via line 24 to the gasifier. Vent gases removed through the separator exit line 22 are preferably introduced via line 28 into the top of vessel 1 where they intermingle with the gases emerging from the reduction zone. This permits utilizing the same cyclone system 7 for both the separator vent gases and the gases produced in the reduction zone.

Control of the system is maintained by charging finely divided iron ore continually at a rate such that satisfactory reduction is obtained, e. g. allowing an ore residence time in the reduction bed of about 10 to 60 minutes, and withdrawing reduced metal from separator 11 at such a rate as to maintain a fixed depth of the metal layer 13 within the separation zone 11.

The carbon removed from the reduction zone with the reduced metal also serves, during passage through the separator and prior to its phase separation, to complete the removal of any oxygen in the form of unreduced ore contained in the stream intermingled with it. The overhead gas from the reduction zone corresponds in nature to blast furnace gas and is similarly useful for combustion service where a low grade fuel gas is satisfactory.

The reduced iron particles withdrawn via line 14 will usually contain a substantial amount of gangue, e. g. between about 10 and 20 per cent. This gangue can be subsequently separated from the reduced iron in any convenient manner, notably by the process described in Patent 2,540,593. Furthermore, some gangue particles essentially free of iron may also be formed in the process. Since such gangue particles will be lighter than the reduced metal, there may be some tendency to elutriation from the reduced iron bed 13 into the coke layer 12. Excessive accumulation of gangue in the system may be prevented in such a case by withdrawing a purge stream of solids, preferably from layer 12. This purge stream may be either discarded or further separated in another elutriator or other suitable means into gangue for discard and coke for recycle to the gasifier.

In reading the foregoing description it should be understood that all ratios and percentages of materials are expressed on a weight basis unless otherwise indicated.

Having described the general nature and a specific embodiment of the invention, it will also be understood that this was done for purposes of illustration rather than limitation and that the present invention includes such other modifications and variations as fall within the scope or spirit of the appended claims.

What is claimed is:

1. A process for reducing ore of the iron ore type to metal which comprises, burning a finely-divided carbonaceous material in a gasification zone with a combustion-supporting gas at a gasifying temperature in the range of 1500° F. to 2700° F. to produce a gas of high CO content containing entrained carbon, introducing the combustion supporting gas into the gasification zone at a sufficiently high velocity to fluidize and maintain in turbulent suspension the finely divided carbonaceous material and to cause substantial entrainment of carbon in the combustion gases emerging from the gasification zone, contacting finely-divided, fluidized ore in a reduction zone with the high CO content gas containing entrained carbon at a temperature between 1000 to 2000° F. but lower than said gasifying temperature whereby the ore is reduced to metal, removing a mixture of metal and carbon from the reduction zone to a separation zone, introducing a non-oxidizing gas at low velocity into a bottom portion of the separation zone in contact with said mixture thereby causing separation of the mixture into a fluidized, non-turbulent upper layer of carbon and a fluidized, non-turbulent lower layer of metal, and removing separated metal and carbon streams from the separation zone.

2. A process according to claim 1 in which the ore is iron ore and in which the combustion-supporting gas is air.

3. A process according to claim 1 in which gas velocities in the reduction zone and gasification zone are maintained in the range of 0.5 to 5 feet per second, and in the separation zone in a range of 0.02 to 0.5 feet per second.

4. A process according to claim 1 in which the carbonaceous material is petroleum coke.

No references cited.